July 18, 1933.  J. J. GARDNER  1,918,465
MOTOR VEHICLE CONTROL SYSTEM
Filed Feb. 23, 1929  2 Sheets-Sheet 1

INVENTOR.
John J. Gardner,
BY Morrison, Kennedy
& Campbell, ATTORNEYS.

July 18, 1933.   J. J. GARDNER   1,918,465
MOTOR VEHICLE CONTROL SYSTEM
Filed Feb. 23, 1929   2 Sheets-Sheet 2
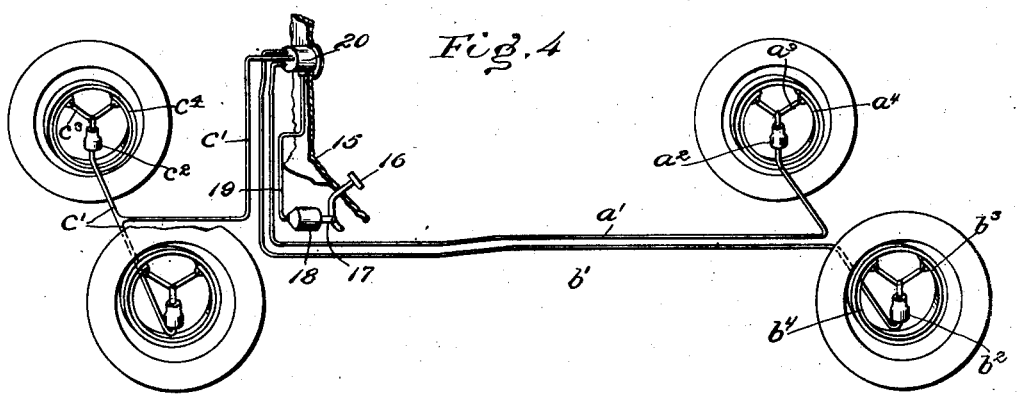
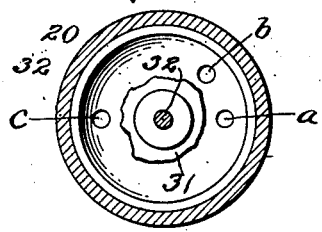
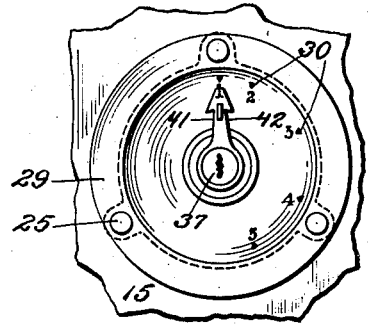
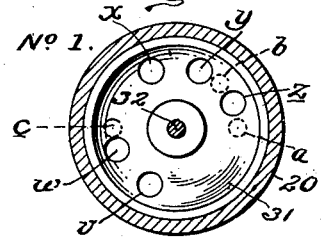
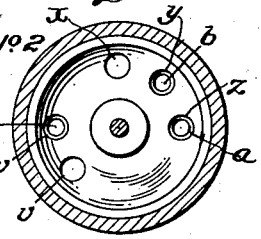
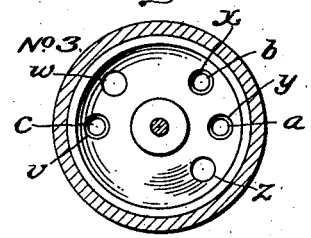
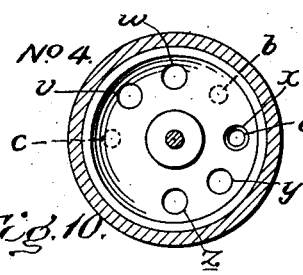
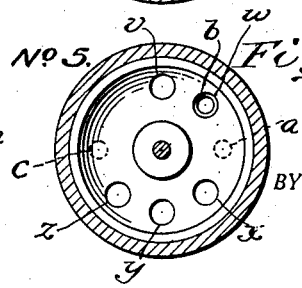
INVENTOR:
John J. Gardner,
BY Morrison, Kennedy
& Campbell, ATTORNEYS.

Patented July 18, 1933

1,918,465

UNITED STATES PATENT OFFICE

JOHN J. GARDNER, OF NEW YORK, N. Y.

MOTOR VEHICLE CONTROL SYSTEM

Application filed February 23, 1929. Serial No. 342,068.

This invention is a novel motor vehicle control system, adapted especially for road vehicles and preferably operating through fluid pressure or hydraulic connections with respect to the braking control of the vehicle. The field of utility of the present invention is coextensive with my prior Patent No. 1,682,781, issued September 4, 1928.

The present invention is adapted especially for use with the standard hydraulic braking systems in which the brake pedal operates a hydraulic pump from which pipe lines extend to the individual brakes, each having a hydraulic actuator or cylinder and piston, a system of springs operating to remove the braking pressure at each brake and to restore the hydraulic conditions and foot pedal when released. Characteristic of modern motor vehicles is the employment of differential gearing at the rear axle for transmitting the drive to the rear wheels, this being done in such a manner that if one rear wheel is substantially free there will be no effective drive upon the other, for which reason when one rear wheel drops into a slippery spot, where it can rotate without grip or traction, the vehicle is deprived of the power of drive at either wheel. This defect is corrected by my prior patent and the present invention.

The general objects of the present invention are to provide a control system which will be an improvement on my prior patent in respect to simplification, greater ruggedness, increased effectiveness and convenience, and reduced cost of construction. A particular object is the improvement of the selective control of the braking of the vehicle, preferably in a manner to permit either one of the rear wheel brakes to be rendered operative, while the other three brakes are inoperative, so that when one rear wheel loses its tractive power by slippage it can be held against rotation so that the other rear wheel can be driven to advance the vehicle out of the difficulty.

A further object and feature of this invention is an improved coordination of the brake control and the motor ignition, the ignition being operative in certain only of the several selective positions hereof, being inoperative in that position wherein the selector is locked with the brakes inoperative and in one position wherein the selector is unlocked and all brakes operative.

A further feature is a convenient means of locking the selective devices in such position that the several brakes and the ignition are inoperative, namely, by means of a key which can only be withdrawn in such position. This insures maximum safety against theft in that the single locking operation both renders the motor inoperative and renders all of the service brakes inoperative, but not the parking brakes.

Other objects and advantages of the present invention will be explained in the hereinafter following description of an illustrative embodiment thereof or will be understood to those conversant with the subject. To the attainment of such objects and advantages the present invention consists in the novel motor vehicle control system, and the novel features of combination, coordination, arrangement, operation and construction herein illustrated or described.

In the accompanying drawings Fig. 1 is a central cross section of the central or control portion of the apparatus of the present invention.

Fig. 4 is a diagrammatic representation of the entire apparatus, including the braking system of a motor vehicle with its operating pedal, control portion, etc.

Figure 1:
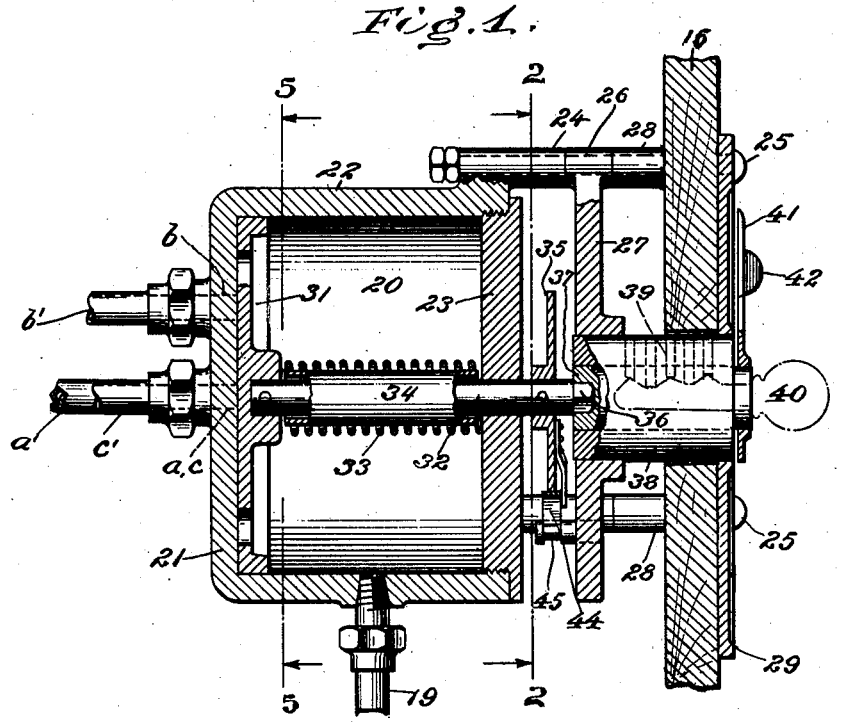

Fig. 5, on a smaller scale than Fig. 1, is a section taken on the line 5—5 of Fig. 1 with the rotary valve disk broken away to show the fixed ports.

Fig. 6 is a rear elevation, that is to say seen from the right side of Fig. 1 whereat the dial faces the driver of the vehicle.

Figs. 7 to 11 are views similar to Fig. 5, but showing also the rotary valve disk, in different positions in the respective figures.

The vehicle is not herein illustrated except as to certain general parts. The instrument board or dash 15 is seen in Figs. 1 and 4. Near its foot is shown the brake pedal 16 which operates through a piston rod 17 and cylinder 18 to compress or force light oil or other hydraulic fluid through a connecting pipe 19 to the central vessel or distributing chamber 20, which may be suitably mounted, for example upon the instrument board, or somewhat to the front of it as shown in Fig. 1. The distributing vessel is shown on an enlarged scale in Fig. 1 and will be described more specifically.

The front wall 21 of the vessel 20 is shown as formed with a plurality of ports $a$, $b$ and $c$. The port $a$ is shown connected by pipe $a'$ with a hydraulic motor or actuator $a^2$ for the right rear wheel brake $a^3$, which may comprise an expanding shoe or ring engaging the inside surface of a flange $a^4$ attached to the wheel. Similarly the fixed port $b$ connects by pipe $b'$ to hydraulic motor $b^2$ actuating the brake $b^3$ cooperating with the flange $b^4$ of the left rear wheel. The port $c$ is connected by pipes $c'$ to the motors $c^2$ of the brakes $c^3$ acting on the flanges $c^4$ of the front wheels. When the ports were all open it is manifest that the depression of the foot pedal, creating hydraulic pressure, would cause the actuation of all four brake motors and the application of all of the brakes. It is to be understood, in the case of the front wheel brakes, that a portion of the pipe lines $c'$ must be flexible to admit of the steering movements of the wheels.

The control of the action is through the hydraulic distributor or vessel 20. This is shown as generally circular, with a front wall 21 containing the ports $a$, $b$ and $c$, and a cylindrical wall 22, the rear end being closed by a circular wall 23 threaded and screwed into place with provision against leakage of liquid. The distributor box may be mounted in a fixed position in front of the dash 15. Its wall 22 is for this purpose shown formed with three ears 24 perforated to receive bolts 25 which pass also through the ears 26 of a fixed spider or disk 27 and through spacing sleeves 28 bearing against the dash 15. The rear heads of the bolts are shown exterior to the dash and arranged to hold in place the dial 29 cooperating with the index or pointer to be described.

The multiple control of the three ports $a$, $b$ and $c$ is herein effected by a rotary valve or disk 31. This has a series of ports $v$, $w$, $x$, $y$, $z$ located and spaced in a particular manner to cooperate with the fixed ports $a$, $b$ and $c$, so that by setting the disk in different rotary positions substantially any desired control of the liquid flow and pressure may be effected. The three wall ports $a$, $b$ and $c$ are shown spaced angularly apart by three units of spacing from $c$ to $b$ and one unit from $b$ to $a$; while the five valve ports are shown spaced respectively by one angular unit from $v$ to $w$, two units from $w$ to $x$, one unit from $x$ to $y$ and one unit from $y$ to $z$, whereby the five selective combinations of wall and valve ports are available as will be more fully described.

The rotary valve 31 is shown as pinned to a rotary stem 32 which extends centrally through the control chamber and thence through an aperture in the front wall 23. In order to maintain the valve under suitable contacting pressure against the wall or seat 21 there is shown a coil spring 33 surrounding a sleeve 34 on the stem 32 and arranged to bear forwardly against the hub of the valve, to maintain resilient pressure. This liquid tight pressure is reenforced by the pressure of the liquid itself and with flatly machined contacting surfaces the tightness of the fitting is adequate to prevent any disadvantageous leakage.

The exterior or rear end of the valve stem 32 is shown as carrying a notched disk 35 assisting to position the valve as will be described, and at its extreme end the stem is squared at 36 and operatively engaged in a square aperture in the rear end of the rotary barrel or cylinder 37 of a lock of conventional type. The lock barrel turns within a casing 38 mounted fixedly in the dash 15 and the spider 27, and a series of tumblers 39 is indicated controlled in the usual manner by a flat key 40. This key is insertible in the "No. 1" position to be described and can only be removed in that position. On the front end of the lock barrel is shown an index or pointer 41 indicating the position in which the apparatus is adjusted, and this may carry a finger piece 42 which the user may contact with his finger when turning the key to assist the adjusting movements.

The dial 29 is marked with a series of index numbers 30 corresponding with the intended positions of the rotary valve. For example the dial may be marked with the designations "1", "2", "3", "4" and "5", although descriptive designations could be substituted. Each of these five positions of the pointer is intended to correspond with one of the adjustment indicated respectively in Figs. 7, 8, 9, 10 and 11 as will be explained later.

The positioning disk 35 is shown as cooperating with a spring 44 supported on a stud 45 and bearing against a roller 46. The disk rotates with the valve stem and has five notches corresponding with the five designated positions, the spring snapping into each notch and in fact tending to turn the disk valve until accurately adjusted to bring the cooperating ports into line.

This completes the enumeration of the brake valve controlling parts. Before describing their action there will be described a preferred electrical control coordinating the operativeness of the ignition of the engine with the adjustment of the brakes, for various purposes, and at the same time regulating a certain audible or other alarm device indicating certain adjustments.

Figure 2:
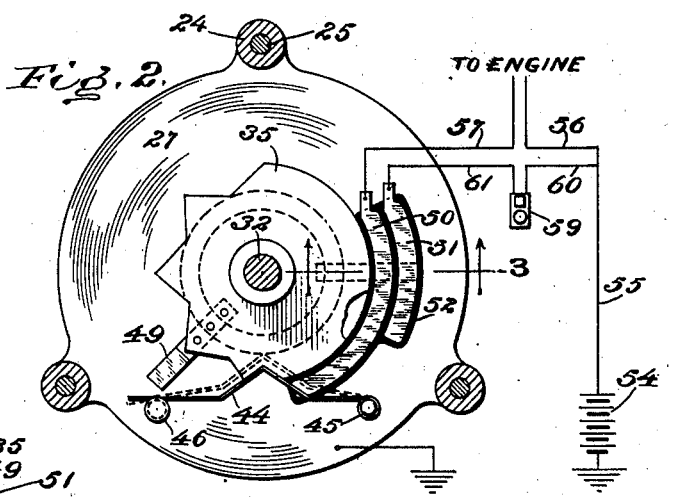
Fig. 2 is a front view of a portion of Fig. 1 taken partly in section on the line 2—2 of Fig. 1.
Figure 3:
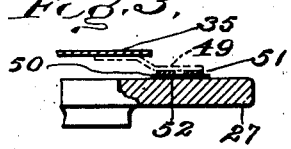
Fig. 3 is a horizontal section of a detail taken on the line 3—3 of Fig. 2.

With the rotation of the valve 31 occurs the rotation of an electric contact or brush 49 which is shown for convenience mounted on the disk 35 on the valve stem. This brush is grounded as indicated and is adapted to swing around with the valve stem into cooperative relation with an insulated ignition contact strip 50 and an alarm contact strip 51. These are shown in Figs. 2 and 3 as concentric strips mounted on the spider or fixed disk 27, with insulation 52 beneath them.

The source of current is indicated as a battery 54. One terminal is grounded and the other terminal connects by wire 55 and wire 56 with the electric or ignition parts of the engine, a cooperating wire 57 extending from the contact 50 to complete the circuit. The wires 56 and 57 are not shown extended to their final positions as their connections will be understood. When the brush 49 is in contact upon the strip 50 the circuit will be closed and the ignition operative. Fig. 2 shows the strip out of contact, but in dotted lines shows it in contact.

When the braking system has been set for the operation of only one of the rear brakes it is desirable that this condition shall make itself known so that the adjustment will not accidentally be allowed to remain after the emergency has passed. For this purpose an audible or other alarm 59 is shown as connected up in circuit as follows. It is connected with the wire 55 by a wire 60, and connected by wire 61 with the contact strip 51. From this it will be clear that whenever the brush 49 is in contact with the strip 51 the alarm 59 will continue to sound, thus warning the driver to change the adjustment after the emergency.

By way of describing the operation of the fixed and movable ports controlling the brakes it will first be noticed that the ports have a particular angular spacing. While this might be varied within the scope of the invention the following preferred arrangement is shown. The fixed ports $a$ and $b$ are spaced 45° apart while the port $c$ is diametrically opposite the port $a$. On the rotary valve disk the ports $v$ and $w$ are 45° apart. The ports $w$ and $x$ are 90° apart. The ports $x$ and $y$ are 45° apart and so are the ports $y$ and $z$. The successive positions may give the following adjustments.

Position 1, as shown in Fig. 7 causes the closing of all of the ports. That is to say the movable or valve ports are in each case out of line with the fixed ports leading respectively to the right rear, the left rear and the front brakes. It follows that when the pointer is set at 1 the service brakes are all inoperative. This is the position in which the key is inserted and removed, and therefore in extracting the key the service brakes are rendered inoperative. As shown in Fig. 2 the ignition circuit is open so that the ignition is inoperative, as it should be when the key is removed.

In position 2, as shown in Fig. 8, the valve disk has been rotated through 22½°. The valve ports $w$, $y$ and $z$ have now come in line with the fixed ports $c$, $b$ and $a$ respectively. In other words by turning the key from position 1 to position 2, as seen in Fig. 6, all of the ports and pipe lines to the several brakes will open and the brakes thereby rendered operative. The ignition is still inoperative. This permits the full braking of the vehicle when the ignition is off.

In position 3, as shown in Fig. 9, the valve has been turned through an additional 45°. All three ports are still open so that all of the brakes are operative. The brush 49 in this position has come around into contact with the strip 50, rendering the ignition operative. This is the normal driving position.

In position 4, as shown in Fig. 10, valve port $x$ has come over fixed port $a$ leading to the right rear brake whereas the other fixed ports are closed. Thus the ignition remains operative, while only the right rear brake is operative. In case the right rear wheel has dropped into a slippery place, with a tendency to spin, the pointer can be set to position 4 and the brake pedal depressed, thus applying the right rear brake to hold the right rear wheel and permit the vehicle to be driven forward at low gear by the left rear wheel.

Position 5 involves a further shift of 45° and in this position the fixed port $b$ is in alinement with the valve port $w$ while the other fixed ports are closed. This enables the left rear wheel to be braked and the car driven by the right rear wheel. In both positions 4 and 5 the brush 49 is in contact with the strip 52 so that the alarm 59 continuously issues a buzzing sound, warning the operator to restore the pointer to position 3 as soon as normal conditions are restored.

The value of the present improvement is manifold. At the No. 1 position, in which the key is inserted and extracted, the ignition is inoperative and the service brakes are out of service. This gives a double check against stealing of the car. It would be difficult to drive without the use of the service brakes. The car would be difficult to sell without entire replacement of the control parts. Another advantage is that the user is not likely to omit removing the key when parking the vehicle as he would be in the case of a key not controlling the ignition. The described order of the positions while advantageous is not essential, and positions 2 and 3, for example, might be reversed.

For normal operation of the vehicle the index will stand at position 3 in which the ignition and brakes are fully operative. From here the adjustment can easily be set back to position 2 when it is desired to discontinue ignition without rendering the brakes inoperative; or back to position 1 where both are desired to be inoperative. On the other hand, the adjustment can be shifted readily to either positions 4 or 5 for the special purposes already outlined, during which adjustment the alarm will sound. In either of these positions a slight application of braking pressure may often be enough to retard the free wheel sufficiently to give the desired traction on the other wheel. The operation is very fully controllable and as the car comes forward the braking pressure can be let up at will. By this arrangement a car can frequently be brought out of difficulty under its own power where otherwise it might have to be hauled out.

For the purposes of claim the pedal operated pump may be described as a hydraulic pressure means, the distributing vessel 20 being interposed in the pipe system to receive the liquid from the pressure means and having a wall within exits or ports for the respective branch pipes leading to the hydraulic motors of the brakes. In one aspect this invention involves a rotary valve disk or circular plate engaging the ported wall, having ports for controlling the flow, and an exterior means for selective adjustment of the disk to the different positions. The disk has an axial stem extending through the liquid in the vessel and through the opposite wall to the exterior adjusting means, with spring means pressing the disk to the ported wall.

It will be noted that the three wall ports are alined with each other while the five ports on the rotary disk or slide valve are alined with each other and with the wall ports, the alinement being circular in accordance with the adjusting movement of the slide or disk. This arrangement permits a relatively small number of valve ports to cooperate with a plurality of wall ports, namely in the illustrated case a total of five valve ports give all the required control of three wall ports. This result is attained by the illustrated arrangement of the several ports as clearly shown in Fig. 5 and Figs. 7 to 11. Taking 45° as the angular unit of spacing, although a different unit might be used, the arrangement may be described as involving three wall ports spaced angularly by three units between ports $c$ and $b$ and one unit between ports $b$ and $a$, while the valve ports are spaced apart by one unit between ports $v$ and $w$, two units between ports $w$ and $x$, one unit between ports $x$ and $y$, and one unit between ports $y$ and $z$.

This gives the five selective adjustments as described, two of which are operatively the same but differentiated by different controls of the ignition circuit.

The brush 49 and the strip 50 may be considered as contacts for making and breaking the ignition circuit, these being operated by connections from the valve adjusting means for making the circuit in all of the driving adjustments, but breaking it at certain adjustments, namely in one adjustment wherein all of the wheel brakes are operative and in another adjustment wherein all of the brakes are inoperative. The described lock and key for the adjusting means is such that the latter is inoperative or non-adjustable while the key is disengaged and wherein the key is disengageable only in an adjustment wherein all of the brakes are inoperative and preferably when the ignition circuit is broken.

It will be noted that the described apparatus is in no particular delicate or subject to breakage. It is not such as to cause any interference with the conventional operation and the usual reliability of hydraulic brakes. The present invention therefore is an addition or supplement to existing apparatuses, giving added facilities without detracting from the existing advantages.

There has thus been described a motor vehicle control system embodying the principles and attaining the advantages of the present invention. Many matters of combination, coordination, arrangement, operation and construction may be variously modified without departing from the principles of the invention and therefore it is not intended to limit the invention to such matters except so far as specified in the appended claims.

What is claimed is:

In a motor vehicle having wheel brakes and hydraulic motors actuating them, a control system having a hydraulic pressure means operable at will and a system of liquid pipes including branches to the hydraulic motors actuating the respective wheel brakes, and in combination with said pressure means and pipe system a distributing vessel interposed in the pipe system to receive the liquid from the pressure means for quick actuation of the motors and to return the liquid to the vessel upon release, said vessel having a wall with alined exit ports for the respective branch pipes, a rotary disk valve movable at will into selected adjustments in contact against the ported wall and having ports alined with each other and with the wall ports for controlling the liquid flow into the respective exit ports, the wall ports and valve ports being in circular alinement, and arranged with three wall ports spaced apart angularly by three units and one unit respectively, and five valve ports spaced apart by one unit, two units, one unit and one unit respectively, whereby five selective combinations of port communications are available.

JOHN J. GARDNER.